(12) United States Patent
Bushey et al.

(10) Patent No.: US 8,401,851 B2
(45) Date of Patent: ***Mar. 19, 2013

(54) SYSTEM AND METHOD FOR TARGETED TUNING OF A SPEECH RECOGNITION SYSTEM

(75) Inventors: Robert R. Bushey, Cedar Park, TX (US); Benjamin Anthony Knott, Round Rock, TX (US); John Mills Martin, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 244 days.

This patent is subject to a terminal disclaimer.

(21) Appl. No.: 12/503,586

(22) Filed: Jul. 15, 2009

(65) Prior Publication Data

US 2009/0287484 A1    Nov. 19, 2009

Related U.S. Application Data

(63) Continuation of application No. 10/917,233, filed on Aug. 12, 2004, now Pat. No. 7,580,837.

(51) Int. Cl.
*G10L 15/06* (2006.01)
*G10L 15/04* (2006.01)
*G10L 15/18* (2006.01)
*G10L 11/00* (2006.01)
*G06F 17/27* (2006.01)

(52) U.S. Cl. ............ 704/244; 704/9; 704/251; 704/257; 704/270

(58) Field of Classification Search .................. None
See application file for complete search history.

(56) References Cited

U.S. PATENT DOCUMENTS

| 4,953,204 | A | 8/1990 | Cuschleg, Jr. et al. |
| 4,967,405 | A | 10/1990 | Upp et al. |
| 5,335,269 | A | 8/1994 | Steinlicht |
| 5,455,903 | A | 10/1995 | Jolissaint et al. |
| 5,497,373 | A | 3/1996 | Hulen et al. |
| 5,522,046 | A | 5/1996 | McMillen et al. |
| 5,530,744 | A | 6/1996 | Charalambous et al. |
| 5,555,299 | A | 9/1996 | Maloney et al. |
| 5,590,186 | A | 12/1996 | Liao et al. |
| 5,652,789 | A | 7/1997 | Miner et al. |
| 5,754,639 | A | 5/1998 | Flockhart et al. |
| 5,754,978 | A | 5/1998 | Perez-Mendez et al. |

(Continued)

FOREIGN PATENT DOCUMENTS

| EP | 0424015 A2 | 4/1991 |
| EP | 0424015 A3 | 4/1991 |

(Continued)

OTHER PUBLICATIONS

Ogino, Tsukasa et al., "Technologies for Internet Infrastructure: Eliminating the World Wide Wait," iNet Japan, Jul. 18-21, 2000, http//www.isoc.org/inet2000/cdproceedings/1g/index.htm, 18 pages.

*Primary Examiner* — Brian Albertalli
(74) *Attorney, Agent, or Firm* — Toler Law Group, PC (57) ABSTRACT

A system and method of targeted tuning of a speech recognition system are disclosed. In a particular embodiment, a method includes determining a frequency of occurrence of a particular type of utterance method and includes determining whether the frequency of occurrence exceeds a threshold. The method further includes tuning a speech recognition system to improve recognition of the particular type of utterance when the frequency of occurrence of the particular type of utterance exceeds the threshold.

20 Claims, 3 Drawing Sheets

U.S. PATENT DOCUMENTS

| | | | |
|---|---|---|---|
| 5,867,817 A | 2/1999 | Catallo et al. | |
| 5,923,745 A | 7/1999 | Hurd | |
| 5,937,051 A | 8/1999 | Hurd et al. | |
| 5,940,476 A | 8/1999 | Morganstein et al. | |
| 5,946,388 A | 8/1999 | Walker et al. | |
| 5,953,704 A | 9/1999 | McIlroy et al. | |
| 5,999,965 A | 12/1999 | Kelly | |
| 6,002,689 A | 12/1999 | Christie et al. | |
| 6,002,760 A | 12/1999 | Gisby | |
| 6,003,011 A | 12/1999 | Sarin et al. | |
| 6,049,594 A | 4/2000 | Furman et al. | |
| 6,118,866 A | 9/2000 | Shtivelman | |
| 6,119,101 A | 9/2000 | Peckover | |
| 6,173,266 B1 | 1/2001 | Marx et al. | |
| 6,173,289 B1 | 1/2001 | Sonderegger et al. | |
| 6,173,399 B1 | 1/2001 | Gilbrech | |
| 6,175,621 B1 | 1/2001 | Begeja | |
| 6,259,786 B1 | 7/2001 | Gisby | |
| 6,260,014 B1* | 7/2001 | Bahl et al. | 704/254 |
| 6,269,153 B1 | 7/2001 | Carpenter et al. | |
| 6,295,432 B1* | 9/2001 | Inoue et al. | 399/270 |
| 6,317,439 B1 | 11/2001 | Cardona et al. | |
| 6,333,980 B1 | 12/2001 | Hollatz et al. | |
| 6,353,608 B1 | 3/2002 | Cullers et al. | |
| 6,366,658 B1 | 4/2002 | Bjornberg et al. | |
| 6,366,668 B1 | 4/2002 | Borst et al. | |
| 6,381,329 B1 | 4/2002 | Uppaluru et al. | |
| 6,385,584 B1 | 5/2002 | McAllister et al. | |
| 6,389,400 B1 | 5/2002 | Bushey et al. | |
| 6,400,804 B1 | 6/2002 | Bilder | |
| 6,400,996 B1 | 6/2002 | Hoffberg et al. | |
| 6,405,159 B2 | 6/2002 | Bushey et al. | |
| 6,414,966 B1 | 7/2002 | Kulkarni et al. | |
| 6,418,424 B1 | 7/2002 | Hoffberg et al. | |
| 6,442,247 B1 | 8/2002 | Garcia | |
| 6,510,414 B1 | 1/2003 | Chaves | |
| 6,519,562 B1 | 2/2003 | Phillips et al. | |
| 6,529,871 B1 | 3/2003 | Kanevsky et al. | |
| 6,553,113 B1 | 4/2003 | Dhir et al. | |
| 6,570,967 B2 | 5/2003 | Katz | |
| 6,584,180 B2 | 6/2003 | Nemoto | |
| 6,587,556 B1 | 7/2003 | Judkins et al. | |
| 6,598,136 B1 | 7/2003 | Norrod et al. | |
| 6,600,736 B1 | 7/2003 | Ball et al. | |
| 6,603,854 B1 | 8/2003 | Judkins et al. | |
| 6,614,781 B1 | 9/2003 | Elliott et al. | |
| 6,631,186 B1 | 10/2003 | Adams et al. | |
| 6,678,360 B1 | 1/2004 | Katz | |
| 6,678,718 B1 | 1/2004 | Khouri et al. | |
| 6,690,788 B1 | 2/2004 | Bauer et al. | |
| 6,694,012 B1 | 2/2004 | Posthuma | |
| 6,697,460 B2 | 2/2004 | Knott et al. | |
| 6,700,972 B1 | 3/2004 | McHugh et al. | |
| 6,704,404 B1 | 3/2004 | Burnett | |
| 6,707,789 B1 | 3/2004 | Arslan et al. | |
| 6,714,631 B1 | 3/2004 | Martin et al. | |
| 6,721,416 B1 | 4/2004 | Farrell | |
| 6,731,722 B2 | 5/2004 | Coffey | |
| 6,738,473 B1 | 5/2004 | Burg et al. | |
| 6,744,861 B1 | 6/2004 | Pershan et al. | |
| 6,744,877 B1 | 6/2004 | Edwards | |
| 6,751,306 B2 | 6/2004 | Himmel et al. | |
| 6,757,306 B1 | 6/2004 | Klish, II et al. | |
| 6,766,320 B1 | 7/2004 | Wang et al. | |
| 6,775,359 B1 | 8/2004 | Ron et al. | |
| 6,778,643 B1 | 8/2004 | Bushey et al. | |
| 6,792,096 B2 | 9/2004 | Martin et al. | |
| 6,807,274 B2 | 10/2004 | Joseph et al. | |
| 6,823,307 B1 | 11/2004 | Steinbiss et al. | |
| 6,831,932 B1 | 12/2004 | Boyle et al. | |
| 6,832,224 B2 | 12/2004 | Gilmour | |
| 6,842,504 B2 | 1/2005 | Mills et al. | |
| 6,847,711 B2 | 1/2005 | Knott et al. | |
| 6,853,722 B2 | 2/2005 | Joseph et al. | |
| 6,853,966 B2 | 2/2005 | Bushey et al. | |
| 6,859,529 B2 | 2/2005 | Duncan et al. | |
| 6,871,212 B2 | 3/2005 | Khouri et al. | |
| 6,879,683 B1 | 4/2005 | Fain et al. | |
| 6,885,734 B1 | 4/2005 | Eberle et al. | |
| 6,891,932 B2 | 5/2005 | Bhargava et al. | |
| 6,895,083 B1 | 5/2005 | Bers et al. | |
| 6,901,366 B1 | 5/2005 | Kuhn et al. | |
| 6,907,119 B2 | 6/2005 | Case et al. | |
| 6,915,246 B2 | 7/2005 | Gusler et al. | |
| 6,925,432 B2 | 8/2005 | Lee et al. | |
| 6,963,983 B2 | 11/2005 | Munson et al. | |
| 7,003,079 B1* | 2/2006 | McCarthy et al. | 379/32.01 |
| 7,006,605 B1 | 2/2006 | Morganstein et al. | |
| 7,031,444 B2 | 4/2006 | Shen et al. | |
| 7,035,388 B2 | 4/2006 | Kurosaki | |
| 7,092,888 B1* | 8/2006 | McCarthy et al. | 704/277 |
| 7,103,542 B2* | 9/2006 | Doyle | 704/231 |
| 7,197,130 B2 | 3/2007 | Paden et al. | |
| 7,242,751 B2 | 7/2007 | Bushey et al. | |
| 7,346,507 B1* | 3/2008 | Natarajan et al. | 704/244 |
| 7,356,475 B2 | 4/2008 | Novack et al. | |
| 7,379,867 B2* | 5/2008 | Chelba et al. | 704/236 |
| 7,450,698 B2 | 11/2008 | Bushey et al. | |
| 7,627,096 B2 | 12/2009 | Bushey et al. | |
| 7,636,432 B2 | 12/2009 | Bushey et al. | |
| 7,724,889 B2 | 5/2010 | Bushey et al. | |
| 7,751,551 B2 | 7/2010 | Bushey et al. | |
| 7,864,942 B2 | 1/2011 | Knott et al. | |
| 7,933,399 B2 | 4/2011 | Knott et al. | |
| 8,005,204 B2 | 8/2011 | Bushey et al. | |
| 2001/0011211 A1 | 8/2001 | Bushey et al. | |
| 2001/0018672 A1 | 8/2001 | Petters et al. | |
| 2001/0021948 A1 | 9/2001 | Khouri et al. | |
| 2001/0032229 A1 | 10/2001 | Hulls et al. | |
| 2001/0034662 A1 | 10/2001 | Morris | |
| 2002/0046030 A1 | 4/2002 | Haritsa et al. | |
| 2002/0057678 A1 | 5/2002 | Jiang et al. | |
| 2002/0059164 A1 | 5/2002 | Shtivelman | |
| 2002/0059169 A1 | 5/2002 | Quarterman et al. | |
| 2002/0067714 A1 | 6/2002 | Crain et al. | |
| 2002/0087385 A1 | 7/2002 | Vincent | |
| 2002/0114432 A1 | 8/2002 | Shaffer et al. | |
| 2002/0133394 A1 | 9/2002 | Bushey et al. | |
| 2002/0133413 A1 | 9/2002 | Chang et al. | |
| 2002/0135618 A1 | 9/2002 | Maes et al. | |
| 2002/0156699 A1 | 10/2002 | Gray et al. | |
| 2002/0165732 A1 | 11/2002 | Ezzeddine et al. | |
| 2002/0196277 A1 | 12/2002 | Bushey et al. | |
| 2003/0026409 A1 | 2/2003 | Bushey et al. | |
| 2003/0035381 A1 | 2/2003 | Chen et al. | |
| 2003/0035516 A1 | 2/2003 | Guedalia | |
| 2003/0069937 A1 | 4/2003 | Khouri et al. | |
| 2003/0097428 A1 | 5/2003 | Afkhami et al. | |
| 2003/0103619 A1 | 6/2003 | Brown et al. | |
| 2003/0114105 A1 | 6/2003 | Haller et al. | |
| 2003/0130864 A1 | 7/2003 | Ho et al. | |
| 2003/0143981 A1 | 7/2003 | Kortum et al. | |
| 2003/0144846 A1 | 7/2003 | Denenberg et al. | |
| 2003/0144919 A1 | 7/2003 | Trompette et al. | |
| 2003/0156133 A1 | 8/2003 | Martin et al. | |
| 2003/0165223 A1 | 9/2003 | Timmins et al. | |
| 2003/0187732 A1 | 10/2003 | Seta | |
| 2003/0187773 A1 | 10/2003 | Santos et al. | |
| 2003/0194063 A1 | 10/2003 | Martin et al. | |
| 2003/0195753 A1 | 10/2003 | Homuth | |
| 2003/0202640 A1 | 10/2003 | Knott et al. | |
| 2003/0202643 A1 | 10/2003 | Joseph et al. | |
| 2003/0202649 A1 | 10/2003 | Haug, Jr. et al. | |
| 2003/0204435 A1 | 10/2003 | McQuilkin et al. | |
| 2003/0235287 A1 | 12/2003 | Margolis | |
| 2004/0005047 A1 | 1/2004 | Joseph et al. | |
| 2004/0006473 A1 | 1/2004 | Mills et al. | |
| 2004/0032862 A1 | 2/2004 | Schoeneberger et al. | |
| 2004/0032935 A1 | 2/2004 | Mills et al. | |
| 2004/0042592 A1 | 3/2004 | Knott et al. | |
| 2004/0044950 A1 | 3/2004 | Mills et al. | |
| 2004/0066401 A1 | 4/2004 | Bushey et al. | |
| 2004/0066416 A1 | 4/2004 | Knott et al. | |
| 2004/0073569 A1 | 4/2004 | Knott et al. | |
| 2004/0083479 A1 | 4/2004 | Bondarenko et al. | |
| 2004/0088285 A1 | 5/2004 | Martin et al. | |
| 2004/0103017 A1 | 5/2004 | Reed et al. | |

| | | |
|---|---|---|
| 2004/0109555 A1 | 6/2004 | Williams |
| 2004/0120473 A1 | 6/2004 | Birch et al. |
| 2004/0125937 A1 | 7/2004 | Turcan et al. |
| 2004/0125938 A1 | 7/2004 | Turcan et al. |
| 2004/0125940 A1 | 7/2004 | Turcan et al. |
| 2004/0161078 A1 | 8/2004 | Knott et al. |
| 2004/0161094 A1 | 8/2004 | Martin et al. |
| 2004/0161096 A1 | 8/2004 | Knott et al. |
| 2004/0174980 A1 | 9/2004 | Knott et al. |
| 2004/0230438 A1 | 11/2004 | Pasquale et al. |
| 2004/0240635 A1 | 12/2004 | Bushey et al. |
| 2004/0243568 A1 | 12/2004 | Wang et al. |
| 2005/0008141 A1 | 1/2005 | Kortum et al. |
| 2005/0015744 A1 | 1/2005 | Bushey et al. |
| 2005/0027535 A1 | 2/2005 | Martin et al. |
| 2005/0041796 A1 | 2/2005 | Joseph et al. |
| 2005/0047578 A1 | 3/2005 | Knott et al. |
| 2005/0055216 A1 | 3/2005 | Bushey et al. |
| 2005/0058264 A1 | 3/2005 | Joseph et al. |
| 2005/0075894 A1 | 4/2005 | Bushey et al. |
| 2005/0078805 A1 | 4/2005 | Mills et al. |
| 2005/0080630 A1 | 4/2005 | Mills et al. |
| 2005/0080667 A1 | 4/2005 | Knott et al. |
| 2005/0131708 A1 * | 6/2005 | Palma et al. ............. 704/275 |
| 2005/0131892 A1 | 6/2005 | Knott et al. |
| 2005/0132262 A1 | 6/2005 | Bushey et al. |
| 2005/0135595 A1 | 6/2005 | Bushey et al. |
| 2005/0141692 A1 | 6/2005 | Scherer et al. |
| 2005/0169441 A1 | 8/2005 | Yacoub et al. |
| 2005/0169453 A1 | 8/2005 | Knott et al. |
| 2005/0201547 A1 | 9/2005 | Burg et al. |
| 2005/0240411 A1 | 10/2005 | Yacoub |
| 2006/0018443 A1 | 1/2006 | Knott et al. |
| 2006/0023863 A1 | 2/2006 | Joseph et al. |
| 2006/0026049 A1 | 2/2006 | Joseph et al. |
| 2006/0039547 A1 | 2/2006 | Klein et al. |
| 2006/0050865 A1 | 3/2006 | Kortum et al. |
| 2006/0062375 A1 | 3/2006 | Pasquale et al. |
| 2006/0093097 A1 | 5/2006 | Chang |
| 2006/0100998 A1 | 5/2006 | Edwards et al. |
| 2006/0109974 A1 | 5/2006 | Paden et al. |
| 2006/0126808 A1 | 6/2006 | Dallessandro et al. |
| 2006/0126811 A1 | 6/2006 | Bushey et al. |
| 2006/0177040 A1 | 8/2006 | Mitra |
| 2006/0188087 A1 | 8/2006 | Kortum et al. |
| 2006/0198505 A1 | 9/2006 | Kortum et al. |
| 2006/0215833 A1 | 9/2006 | Mahoney et al. |
| 2006/0291642 A1 | 12/2006 | Bushey et al. |
| 2007/0025528 A1 | 2/2007 | Knott et al. |
| 2007/0025542 A1 | 2/2007 | Bushey |
| 2007/0041551 A1 | 2/2007 | Whitecotten et al. |
| 2007/0047718 A1 | 3/2007 | Idler et al. |
| 2007/0047720 A1 | 3/2007 | Brandt et al. |
| 2007/0116230 A1 | 5/2007 | Brandt et al. |

FOREIGN PATENT DOCUMENTS

| | | | |
|---|---|---|---|
| EP | 0424015 | B1 | 4/1991 |
| EP | 0876652 | A4 | 6/1999 |
| WO | 9726612 | | 7/1997 |
| WO | 0137539 | A2 | 5/2001 |
| WO | 0137539 | A3 | 5/2001 |
| WO | 2004017584 | A1 | 2/2004 |
| WO | 2004049222 | A2 | 6/2004 |

* cited by examiner

SYSTEM AND METHOD FOR TARGETED TUNING OF A SPEECH RECOGNITION SYSTEM

CROSS REFERENCE TO RELATED APPLICATION

This application is a continuation of, and claims priority from U.S. patent application Ser. No. 10/917,233, filed on Aug. 12, 2004, which is incorporated herein by reference in its entirety.

FIELD OF THE DISCLOSURE

The present disclosure relates to a system and method of targeted tuning of a speech recognition system.

BACKGROUND

Many speech solutions, such as speech-enabled applications and speech recognition systems, utilize a computing device to "listen" to a user utterance and to interpret that utterance. Depending upon design considerations, a speech solution may be tasked with accurately recognizing a single user's utterances. For example, a dictation-focused solution may need to be highly accurate and tuned to a given user. In other applications, a system designer may want a speech solution to be speaker-independent and to recognize the speech of different users, provided the users are speaking in the language the application is designed to process and the users are uttering phrases associated with the application.

In practice, a user utterance may be "heard" by a computing device and may be broken into pieces. Individual sounds and/or a collection of individual sounds may be identified and matched to a predefined list of sounds, words, and/or phrases. The complex nature of translating raw audio into discrete pieces and matching the audio to a pre-defined profile often involves a great deal of signal processing and may, in some instances, be performed by a speech recognition (SR) engine executing on a computing system.

While SR engines may be relatively accurate, these engines and other speech solution components often require tuning. In practice, a system's recognition rate at implementation may be unacceptably low. This recognition rate may be improved through tuning. However, conventional approaches to tuning may be costly. Moreover, the effectiveness of conventional tuning approaches is often difficult to quantify and predict.

DETAILED DESCRIPTION

A system and method of targeted tuning of a speech recognition system are disclosed. In a particular embodiment, a method includes determining a frequency of occurrence of a particular type of utterance method and includes determining whether the frequency of occurrence exceeds a threshold. The method further includes tuning a speech recognition system to improve recognition of the particular type of utterance when the frequency of occurrence of the particular type of utterance exceeds the threshold.

Another particular embodiment discloses a speech recognition system that includes a speech module to assign an utterance type to a received utterance. The speech recognition system includes a targeting engine to compare a frequency of occurrence of the utterance type to a threshold. A tuning engine tunes the speech module to improve recognition of the utterance type when the frequency of occurrence of the utterance type exceeds the threshold.

Another particular embodiment discloses a computer readable storage medium including instructions that, when executed by a processor, cause the processor to tune a speech recognition device when a frequency of an utterance type exceeds a threshold. The computer readable storage medium includes instructions that, when executed by the processor, cause the processor to determine a frequency of occurrence of an utterance type. The computer readable storage medium includes instructions, that when executed by the processor, cause the processor to compare the frequency of occurrence of the utterance type to a threshold. The computer readable storage medium also includes instructions that, when executed by the processor, cause the processor to tune a speech recognition device to recognize the utterance type with improved accuracy when the frequency of occurrence of the utterance type exceeds the threshold.

From a high level, one technique for providing targeted tuning of a speech-enabled system may include deploying a speech recognition module to interpret a plurality of utterance types. The technique may also include accessing information representing a collection of recorded utterances and an indication of how each of the recorded utterances was interpreted by the speech recognition module. The assigned interpretations may be compared to accurate interpretations, and a separate accuracy value may be determined for each of the plurality of utterance types. With some implementations, if the accuracy value for a given type of utterance is too low, a selection of utterances having the given type may be used to tune the speech recognition module.

In effect, a deployed speech recognition system may be tuned to better recognize the specific words and/or phrases that give the system difficulties. Similarly, if a deployed system has an acceptable recognition rate for certain utterances, those utterances may be exempted from additional tuning—helping to protect those utterances that enjoy an acceptable recognition rate from inadvertent recognition rate degradation.

Targeting the tuning efforts on problematic utterances may help reduce system-tuning costs. Moreover, the effectiveness of the targeted tuning approach may prove easier to quantify and/or predict—allowing a system administrator to produce recognizable improvements in the deployed system's overall recognition rate by focusing on specific areas of concern.

Figure 1:
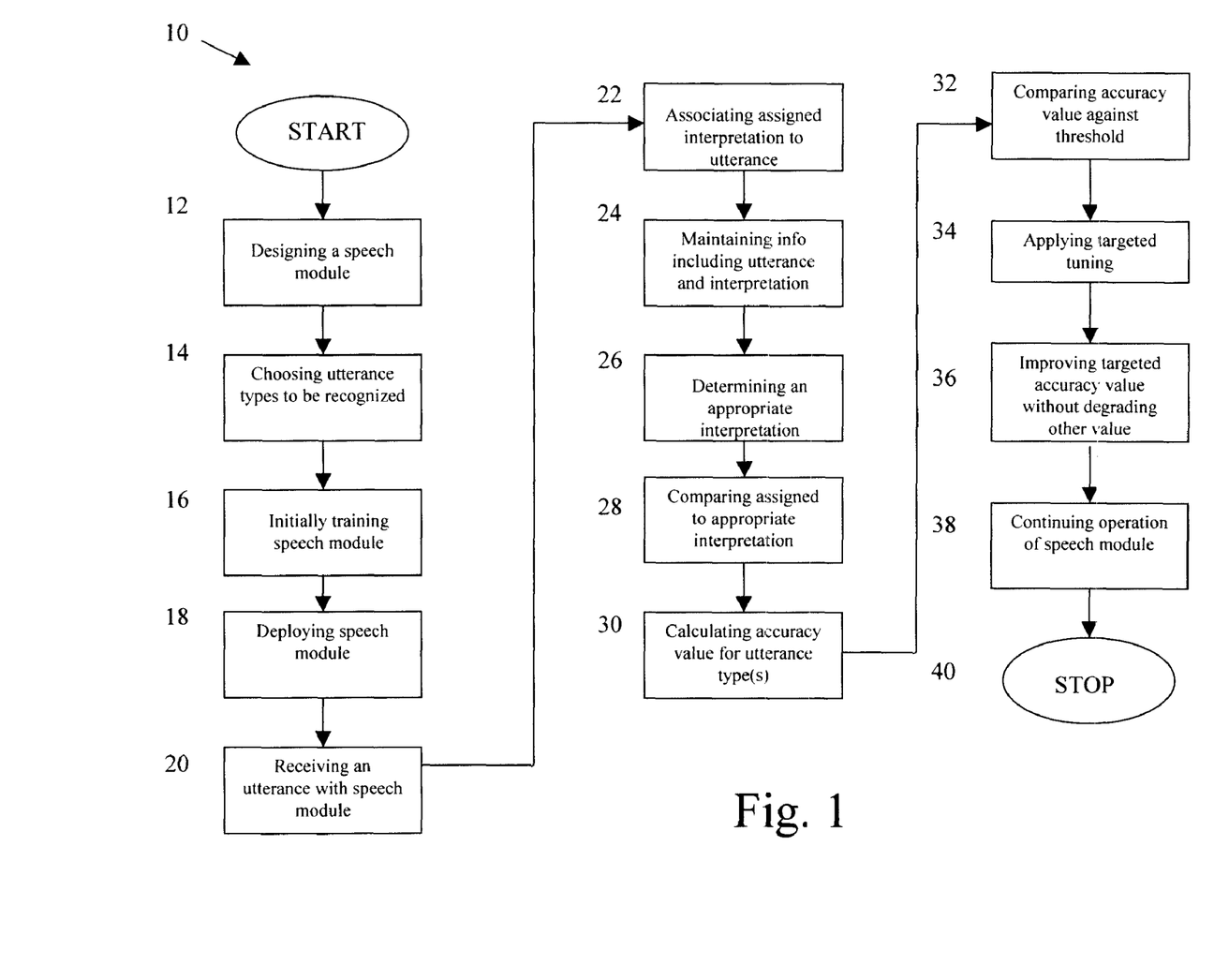
FIG. 1 presents a flow diagram for providing targeted speech solution tuning in accordance with the teachings of the present disclosure.

FIG. 1 presents a flow diagram for providing targeted speech solution tuning in accordance with the teachings of the present disclosure. A technique 10 of FIG. 1 may begin with designing a speech module as indicated at 12. The process of designing the speech module may include, for example, making decisions as to whether the system to be deployed will be speaker-dependent, speaker-independent, capable of recognizing words and/or phrases, designed to recognize a broad range of utterance types, a limited range of utterance types, etc.

In one embodiment, a speech recognition system to be deployed may be designed to be speaker-independent and to recognize utterance types that include several different action requests. Depending upon implementation detail, an action request may be a single word, a phrase, a sentence, etc. In one embodiment, an action request may be an Action-Object request, that may include a statement indicating an action to be taken and an object related to that action. For example, a bill-paying request includes a "Pay" action coupled with a "Bill" object. Other Action-Object requests may include, for example, inquire balance, change service, acquire service, cancel service, inquire bill, inquire account, schedule payment, and reconnect service.

At 14, utterance types to be recognized may be selected, and the speech module may be initially trained at 16. In a speaker-independent system, thousands of speech samples from many people may be considered in an effort to develop a profile for expected utterances. The profile may represent, for example, a derived "average" caller profile. The samples may, for example, be collected from actual deployed speech applications and/or purchased as pre-recorded samples of people uttering the expected phrases in a phonetically balanced American English or other appropriate language/dialect.

At 18, the speech module may be deployed into a live environment. The environment may be, for example, a call center application. At 20, the speech module may receive an utterance. An incoming signal may represent the utterance and may be digitized for further manipulation. In practice, the speech module may digitize the incoming speech signal and calculate utterance parameters.

At 22, the system may compare the utterance parameters to a "library" of known and/or expected phrases and attempt to find the best match—associating an assigned interpretation to the utterance. Depending upon earlier design considerations, the system may, for example, perform "whole word" recognition and/or sub-word recognition like "phonetic recognition." In some cases, the system may or may not be capable of finding a match and/or assigning an interpretation. If an interpretation is assigned, the assigned interpretation may or may not be accurate.

At 24, information associated with a call may be maintained. The information may include, for example, a recording of a received utterance, an indication of whether an interpretation was made, an indication of what interpretation was made, an utterance receipt time, an indication of whether the assigned interpretation was accurate, etc. In practice, an utterance recording may be saved as a discrete audio file, having a format such as a WAV format, an MP3 format, an AU format, or a MIDI format.

At 26, the deployed system, the speech module, and/or some other system or individual may consider a previously received utterance and independently assign an "appropriate" interpretation to the utterance. The appropriate interpretation may be compared against the assigned interpretation at 28 to determine how well the speech module is operating.

In some embodiments, an independent accuracy value may be calculated for at least one utterance type at 30. The independent accuracy value may effectively indicate how well a speech module is "recognizing" a given utterance type. The accuracy value may be based on a single criteria or a combination of criteria such as recognition rates, hits, misses, etc., for a specific utterance type. However determined, it may become apparent that a speech-enabled system more accurately responds to a first type of utterance and has a more difficult time with a second type of utterance. For example, a system may recognize an action like "pay bill" with an acceptable level of accuracy and may not recognize an action like "transfer to agent" with an acceptable level of accuracy.

As such, an administrator and/or tuning application may elect to apply targeted tuning to the speech system to improve recognition of the second type of utterance.

One example methodology for calculating an accuracy value could include, for example, calculating a hit rate value and a false alarm value for a given utterance type. In practice, the accuracy value may include or represent one or more of these and/or other values. The methodology may also include determining a frequency value for the given utterance type. An administrator may want to know, for example, how "important" an utterance type is. If an utterance type represents less than one percent of the received utterances, an administrator may determine that the utterance type does not warrant additional tuning. The importance threshold may be a predefined value and/or importance threshold level decisions may be made on a more ad hoc basis.

Similarly, an administrator may set a threshold value for an accuracy value, a hit rate value, a false alarm value, etc. Again, the threshold values may be pre-set or adjusted in an ad hoc manner. As mentioned above, an assigned accuracy value may be compared at 32 against a threshold value to determine if a system needs tuning. In accordance with one aspect of the present disclosure, a system administrator and/or a tuner may determine that a specific utterance type recognition rate is too low and elect to use a tuning application at 34 to improve the system recognition rate. Operationally, the tuning application may initiate the accessing of interpretive information that represents a received utterance and an assigned interpretation. For example, a given system may maintain a historical record of its own performance. The record may include, for example, recordings of received utterances and system assigned interpretations for each of the received utterances.

A given tuning application may access an appropriate interpretation for each of the received utterances. The appropriate interpretation may represent a more accurate interpretation of an utterance and may be generated by the tuning application and/or by an entity separate from the tuning application. The application may then begin targeted tuning, which may involve, for example, feeding a collection of one type of utterance into a learning module. In one embodiment, the process of feeding the learning module may include playing one or more files that represent recordings of an utterance type while also inputting an appropriate interpretation for the recordings.

At 36, improving recognition of one type of utterance may occur without degrading recognition of other types of utterances. This objective may be facilitated, for example, by attempting to avoid the feeding of non-targeted utterance types into the learning module. At 38, operation of the speech module may be continued, and a future date may be selected for calculating the effectiveness of the targeted tuning. The technique 10 may then progress to stop at 40.

The various acts of the technique 10 may be amended, altered, added to, removed, looped, etc. without departing from the teachings. Moreover, a single entity and/or a combination of entities may perform acts of the technique 10. For example, some of the acts may be performed in connection with an automated call router, a voice activated services platform, a call center, and/or some other operational environment.

Figure 2:
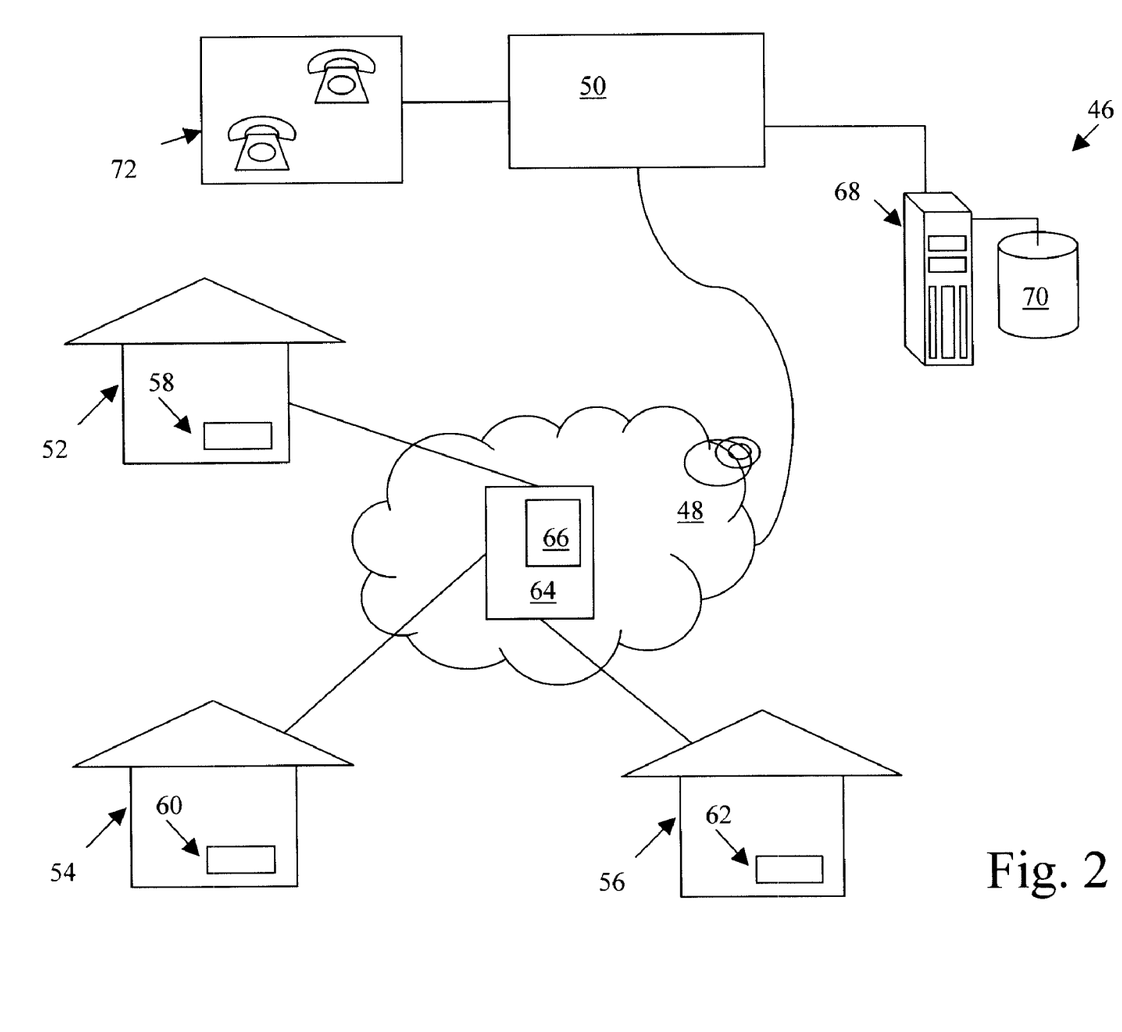
FIG. 2 shows one embodiment of a speech-enabled system that incorporates teachings of the present disclosure.

FIG. 2 shows one embodiment of a speech-enabled system 46 that incorporates teachings of the present disclosure. In practice, a communication network 48, which may be a Public Switched Telephone Network (PSTN), a cable network, an Internet, an intranet, an extranet, or some other network capable of carrying voice traffic, may be communicatively coupled to a speech system 50. A caller from a location, such as location 52, 54, and/or 56, may place a call to the speech system 50 in an effort to receive, for example, information and/or some form of customer service.

A caller may use a communication device, such as device 58, 60, or 62 to link to a node 64 of network 48. The devices 58, 60, and 62 may be, for example, Plain Old Telephone Service (POTS) telephones, voice over IP telephones, computers, cellular telephones, wireless devices, and/or some other device capable of initiating the communication of information via a network.

Depending upon the architecture of the network 48, incoming communications may be multiplexed, converted from a circuit switched communication to a packet switched communication, converted from text to speech, and/or other types of call modifications at an interface 66 before the communication is passed on to the system 50.

As depicted, the system 50 may include a computing platform 68 and a repository 70 storing a sample of utterances received by the system 50. In practice, the platform 68 may perform speech recognition functions. The platform 68 may receive a verbal communication via the network 48 and process the communication in an effort to properly interpret the communication. The communication itself, as well as an assigned interpretation may be captured and saved in the repository 70. Additional information may also be stored in the repository 70. Additional information may be call-related and may include information such as call time, call duration, calling party number, caller language, etc.

In some cases, the platform 68 may assist in interpreting an utterance as a request to speak with an agent. In such a situation, the platform 68 may direct a component of the system 50 to route a caller to a help desk operator at a call center 72. The system 50 may take several forms. For example, the system 50 may be an integrated solution— including multiple features and capabilities in a single device, having a common housing. The system 50 may also take on a more decentralized architecture—where devices and functions are located remote from one another. An example of a relatively centralized system is depicted in FIG. 3.

Figure 3:
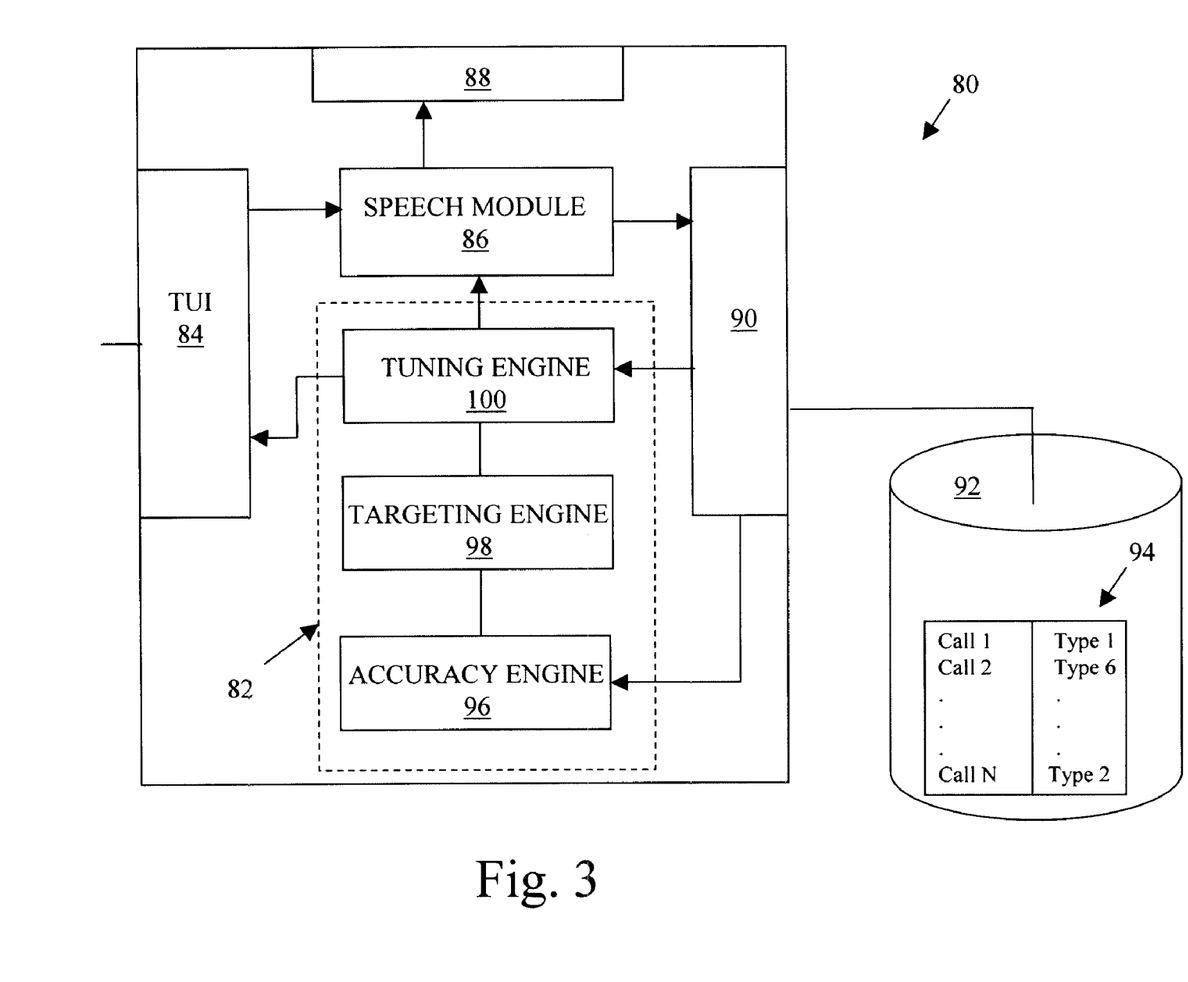
FIG. 3 presents a high-level block diagram of a speech-enabled system incorporating a training tool in accordance with the teachings of the present disclosure.

FIG. 3 presents a high-level block diagram of a speech-enabled system 80 incorporating a training tool subsystem 82 in accordance with the teachings of the present disclosure. In operation of the speech-enabled system 80, an utterance may be received via a Telephone User Interface (TUI) 84. The utterance may be passed to a speech module 86, that may act as a speech recognition engine and assign an utterance type to the utterance. The speech module 86 may also include logic that makes a call routing and/or a call response decision based at least partially upon the assigned utterance type. Effectuating the decision of the speech module 86 may be facilitated in some cases by an interface 88.

In practice, a recording of the utterance and an assigned utterance type for the call may be communicated via an interface 90 to a repository 92. The recording, assigned utterance type, and other call related information may be stored in a table 94 or other structured and searchable information store.

In some embodiments, an accuracy engine 96 may periodically query the repository 92 for information maintained in the table 94. The accuracy engine 96 may use retrieved information to determine if an assigned utterance type for a given captured utterance represents an accurate interpretation of the given captured utterance. Information representing the accuracy engine 96's analysis may be transferred to a targeting engine 98. The targeting engine 98 may use the analysis to help determine an accuracy level of the system 80 in identifying a first type of utterance and another accuracy level of the system 80 in identifying a second type of utterance. The targeting engine 98 may also include logic that compares a calculated accuracy value for one or more utterance types against a threshold or acceptable accuracy level. If an utterance type suffers from an unacceptably low accuracy value, the targeting engine 98 may output an indicator informing the subsystem 82 of a need to train the system 80 on that particular utterance type.

In some embodiments, a system, such as the system 80 may include an integrated tuning engine 100. The tuning engine 100 may recognize the indicator output by the targeting engine 98, and begin tuning the system 80 to better recognize the utterance type that is causing the system 80 difficulties. In practice, the tuning engine 100 may feed the speech module 86 with a collection of utterances having a first type if the first type accuracy level is too low. The collection of utterances may, in some embodiments, include actual captured utterances stored in the repository 92. In some embodiments, the tuning engine 100 may take the necessary steps to avoid feeding other utterance types to the speech module 86.

Though the various engines and components of the system 80 and the subsystem 82 are depicted as independent blocks, many of the features could be combined and/or further separated. In some embodiments, one or more of the depicted components may be embodied in software that executes on a computing platform. For example, a computer-readable medium may include a set of instructions embodying the accuracy engine, the targeting engine, and the tuning engine. Moreover, one or more aspects of the system 80 may be associated with an automated call router, a voice activated services platform, a call center, and/or some other operational computing system that interacts with a caller.

The above-disclosed subject matter is to be considered illustrative, and not restrictive, and the appended claims are intended to cover all such modifications, enhancements, and other embodiments that fall within the scope of the present invention.

What is claimed is:

1. A method, comprising:
    determining a frequency of occurrence of a particular type of utterance;
    using a targeting engine comprising instructions that, when executed by a processor, cause the processor to determine whether the frequency of occurrence of the particular type of utterance exceeds a threshold; and
    tuning a speech recognition system to improve recognition of the particular type of utterance when the frequency of occurrence of the particular type of utterance exceeds the threshold.

2. The method of claim 1, wherein tuning the speech recognition system comprises inputting a collection of utterances of the particular type of utterance to a learning module of the speech recognition system.

3. The method of claim 1, further comprising calculating a hit rate associated with the particular type of utterance.

4. The method of claim 1, further comprising calculating a false alarm value associated with the particular type of utterance.

5. The method of claim 1, further comprising maintaining a record of performance of the speech recognition system.

6. The method of claim 5, wherein an accuracy of recognition is based on the record of performance of the speech recognition system.

7. The method of claim 1, wherein an accuracy of recognition of the particular type of utterance is based on a recognition rate of the particular type of utterance.

8. A speech recognition system, comprising:
a processor;
a speech module to assign an utterance type to a received utterance;
a targeting engine comprising instructions that, when executed by the processor, cause the processor to compare a frequency of occurrence of the utterance type to a threshold; and
a tuning engine to tune the speech module to improve recognition of the utterance type when the frequency of occurrence of the utterance type exceeds the threshold.

9. The speech recognition system of claim 8, wherein tuning the speech module comprises feeding a collection of utterances of the utterance type to the speech module.

10. The speech recognition system of claim 9, wherein the collection of utterances includes one or more pre-recorded utterances stored in a repository of recordings of utterances.

11. The speech recognition system of claim 8, further comprising an accuracy engine to determine an accuracy of recognition of the utterance type.

12. The speech recognition system of claim 11, wherein the accuracy of recognition of the utterance type is compared to an accuracy threshold.

13. The speech recognition system of claim 12, wherein the tuning engine tunes the speech module to improve the accuracy of recognition of the utterance type when the accuracy of recognition of the utterance type is less than the accuracy threshold.

14. The speech recognition system of claim 8, further comprising a repository of recordings of utterances.

15. A non-transitory computer readable storage medium comprising instructions that, when executed by a processor, cause the processor to:

determine a frequency of occurrence of an utterance type;
compare the frequency of occurrence of the utterance type to a threshold; and
tune a speech recognition device to recognize the utterance type with improved accuracy when the frequency of occurrence of the utterance type exceeds the threshold.

16. The non-transitory computer readable storage medium of claim 15, further comprising instructions that, when executed by the processor, cause the processor to determine an accuracy of recognition of the utterance type.

17. The non-transitory computer readable storage medium of claim 15, further comprising instructions that, when executed by the processor, cause the processor to input a plurality of utterance recordings to the speech recognition device.

18. The non-transitory computer readable storage medium of claim 17, further comprising instructions that, when executed by the processor, cause the processor to determine a rate at which utterances of the utterance type are correctly interpreted.

19. The non-transitory computer readable storage medium of claim 17, further comprising instructions that, when executed by the processor, cause the processor to tune the speech recognition device until a desired accuracy of recognition is achieved for the utterance type.

20. The non-transitory computer readable storage medium of claim 17, further comprising instructions that, when executed by the processor, cause the processor to determine the threshold from a table of thresholds for each of a plurality of utterance types.

* * * * *

UNITED STATES PATENT AND TRADEMARK OFFICE
CERTIFICATE OF CORRECTION

PATENT NO. : 8,401,851 B2
APPLICATION NO. : 12/503586
DATED : March 19, 2013
INVENTOR(S) : Robert R. Bushey et al.

It is certified that error appears in the above-identified patent and that said Letters Patent is hereby corrected as shown below:

In the Claims

Column 6, Claim 2, Lines 51-53, "2. The method of claim 1, wherein tuning the speech recognition system comprises inputting a collection of utterances of the particular type of utterance to a learning module" should read --2. The method of claim 1, wherein tuning the speech recognition system comprises inputting a collection of utterances of the particular type to a learning module--.

Column 7, Claim 9, Lines 12-13, "9. The speech recognition system of claim 8, wherein tuning the speech module comprises feeding a collection of" should read --9. The speech recognition system of claim 8, wherein the tuning of the speech module comprises feeding a collection of--.

Column 7, Claim 10, Line 17, "utterances stored in a repository of recordings of utterances." should read --utterances stored in a repository of the speech recognition system.--.

Signed and Sealed this
Eighteenth Day of June, 2013

Teresa Stanek Rea
*Acting Director of the United States Patent and Trademark Office*